Figure 1:
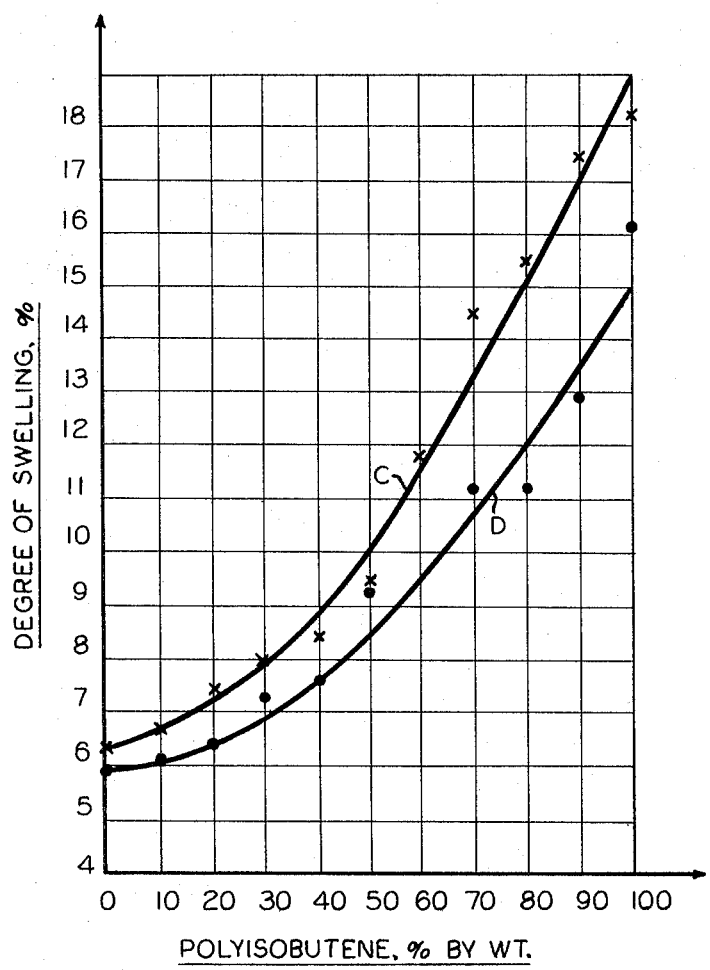

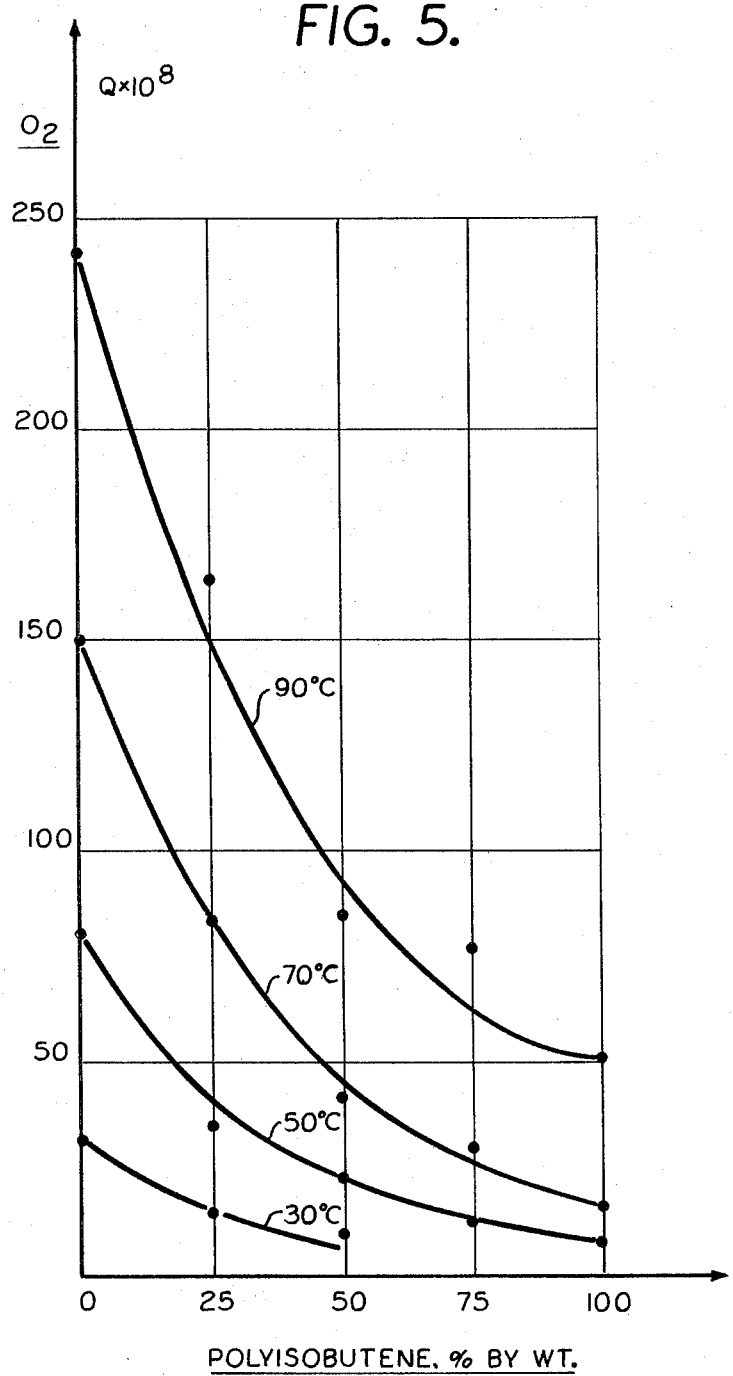

United States Patent Office 3,299,183
Patented Jan. 17, 1967

3,299,183
CO-VULCANIZABLE MIXES OF AN AMORPHOUS ETHYLENE-ALPHA OLEFIN COPOLYMER AND POLYISOBUTYLENE AND VULCANIZED ELASTOMERS THEREOF HAVING LOW PERMEABILITY TO GASES
Camillo Borghese, Terni, Italy, assignor to Montecatini Edison S.p.A., Milan, Italy
Filed Oct. 24, 1961, Ser. No. 147,281
Claims priority, application Italy, Oct. 28, 1960, 18,770/60
10 Claims. (Cl. 260—897)

The present invention relates to co-vulcanizable mixes of olefinic copolymers and polymers. More particularly, this invention relates to mixtures of copolymers of ethylene with alpha-olefins such as propylene and/or butene, and of a polymer such as polyisobutylene, and to elastomers obtained therefrom by covulcanization in the presence of organic peroxides and sulfur and/or quinone type compounds, with or without addition of reinforcing fillers, stabilizers and pigments, which elastomers are characterized by a very low permeability to gases as well as excellent mechanical properties.

It is known that polyisobutene, due to its structure and the fact that it is a completely saturated elastomer, can be cross-linked only with great difficulty and even then only to an insufficient degree.

United States Patent No. 2,748,104 and British Patent No. 725,905 disclose the possibility of cross-linking polyisobutylene by means of tertiary butyl peroxide with the addition of sulfur, and in a second stage (thus improving the cross-linking), with the addition of p-benzoquinone dioxime. However, the degree of cross-linking and the resulting mechanical characteristics are absolutely insufficient for imparting a rubber-like quality to the thus-treated polyisobutene, and in fact this compound is not employed as a rubber.

In Table I the values of various mechanical properties are reported as determined on polyisobutene mixes vulcanized with tertiary butyl peroxide and sulfur, with or without p-benzoquinone dioxime and the addition of reinforcing carbon black, under the optimum conditions described in the aforementioned patents.

a rubber, exhibits certain desirable physico-chemical properties, the most important of which include very low permeability to gases and good resistance to chemical and weathering agents.

It is known that copolymers of ethylene with alpha-olefins, more particularly ethylene-propylene and ethylene-butene copolymers, can be cross-linked by heating in the presence of organic peroxides such as dialpha-cumyl peroxide, tertiary butyl-cumyl peroxide, tetrachloro tertiary butyl peroxide, etc. When the vulcanization is carried out in the presence of sulfur in preferably equimolecular amounts with respect to the peroxide and carbon black or other reinforcing fillers, a synthetic rubber having very good mechanical and elastic properties is obtained. Moreover, the rubber obtained from an ethylene-propylene or ethylene-butene copolymer, due to the saturated nature of the elastomer of which it consists, presents extraordinary qualities of resistance to chemical agents and weathering.

In Table II some characteristic data is reported, as determined on sheets vulcanized in a press at 165° C. for 30 minutes. The sheets contain different amounts of vulcanizing agent. The sheets are vulcanized products made from an ethylene-propylene copolymer having a Mooney viscosity index at 100° C. of 50 (ASTM–D927–57 T) and an ethylene/propylene molar ratio of 1:1. The compositions are tabulated below:

[Parts by weight]

|  | Mix A | Mix B |
|---|---|---|
| Copolymer (ethylene-propylene) | 100 | 100 |
| Carbon black (HAF furnace type) | 50 | 50 |
| Tertiary butyl-cumyl peroxide | 4 | 2 |
| Sulfur | 1 | 0.3 |

TABLE I

| Components | Mixes | | | Tensile[1] strength | Elongation at break, percent | Modulus at 300% kg./cm.[2] | Residual elongation,[2] percent |
|---|---|---|---|---|---|---|---|
|  | 1 | 2 |  |  |  |  |  |
| Polyiosbutene | 100 | 100 | Mix 1 | 94 | 850 | 14 | 94 |
| Carbon black | 50 | 50 |  |  |  |  |  |
| Sulfur | 2 | 2 | Mix 2 | 97 | 730 | 25 | 28 |
| Tertiary butyl peroxide | 5 | 5 |  |  |  |  |  |
| Quinone dioxime |  | 5 |  |  |  |  |  |

[1] Scott in kg./cm.$^2$.
[2] After 1 hour at 200% elongation; measured 1 minute after release.
NOTE.—Vulcanized at 160° C. for 60 minutes.

It is evident that the mechanical and elastomeric characteristics are very low.

In the same patents it is also stated that the behavior of tertiary butyl peroxide with polyisobutylene, carbon black and sulfur is unique in the sense that a great number of similar chemical substances substituted therefore did not induce cross-linking of polyisobutene.

On the other hand, polyisobutene, although not used as

TABLE II

|  | Tensile strength, kg./cm.$^2$ | Elongation at break, percent | Modulus at 300% of elongation, kg./cm.$^2$ | Residual elongation, percent |
|---|---|---|---|---|
| Mix A | 152 | 260–290 |  | 4 |
| Mix B | 185 | 360–445 | 126 | 6 |

Careful determinations of the permeability to gases such as hydrogen, oxygen and nitrogen, carried out on films of cross-lined ethylene-propylene or ethylene-butene copolymer (without fillers) have however shown that their permeability constants (at a temperature from about 30 to 90° C.) are very high, and are higher than those of the other cross-linked elastomers (without fillers) such as natural rubber, butadiene-styrene copolymer, isoprene-isobutene copolymers, etc.

An object of the present invention is to decrease the gas permeability of copolymers of ethylene with alpha-olefins, particularly such alpha-olefins as propylene and butene.

Another object of the invention is to obtain new mixes comprising an olefin polymer and a copolymer, more particularly polyisobutylene and a copolymer of ethylene with propylene and/or butene.

Surprisingly, such mixes can be co-vulcanized in the presence of a peroxide and sulfur, either with or without the addition of reinforcing fillers, stabilizers and pigments, to produce elastomers having a very low permeability to gases and also having high mechanical characteristics. In order to demonstrate that the high degree of gas impermeability of polyisobutene could be utilized to reduce the high permeability of ethylene-propylene or ethylene-butene copolymers, several covulcanization tests were carried out, either with or without reinforcing fillers, and the materials thus obtained were tested for gas permeability.

Unexpectedly, it has been found that mixes containing the two elastomers in any proportion can be covulcanized. Moreover, the vulcanization of the mixes is better than that which could be predicted from the cross-linking of the single elastomers, i.e., the cross-linking remains considerable even if the mix contains high proportions of (saturated) polyisobutylene.

The invention will be illustrated with reference to the following examples which should be considered illustrative rather than limiting.

Example 1

In FIGURE 1 are reported the values of the degree swelling at equilibrium (in carbon tetrachloride at 30° C. for 48 hours) as a function of variable amounts of polyisobutene (British Standard 903–Part 27) for specimens prepared from sheets vulcanized in a press, consisting of mixes having the following compositions:

| Amounts by weight | Mix C | Mix D |
| --- | --- | --- |
| Copolymer (ethylene-propylene) | 100-X | 100-X |
| Polyisobutene | (Variable) | (Variable) |
| Tertiary butyl-cumyl peroxide | 3 | 4 |
| Sulfur | 0.75 | 1 |

Note.—Vulcanized for 40 minutes at 165° C.

As is known, swelling degree at equilibrium depends in a rather complicated manner on the degree of cross-linking, as described by the Flory-Huggins relation (Flory, "Principles of Polymer Chemistry," page 580), but it can be said approximately that the degree of swelling is inversely proportional to the cross-linking.

From FIGURE 1, it appears that for both mixes C and D, the behavior of the swelling degree is not linear, and FIGURE 1 therefore shows good cross-linking even at high proportions of polyisobutylene.

In Table III are reported not only the degree of swelling at $CCl_4$ but also other mechanical characteristics, i.e., residual elongation after a 200% elongation, elongation at break, elastic modulus at 300%, tensile strength, for carbon-type mixes without the presence of reinforcing fillers.

TABLE III

| Polyisobutene, percent by weight | Swelling degree in $CCl_4$, percent | Residual elongation after 200% elongation, percent | Elongation at break, percent | Elastic modulus at 300%, kg./cm.$^2$ | Tensile strength kg./cm.$^2$ |
| --- | --- | --- | --- | --- | --- |
| 0 | 6.35 | Broken | 310 | 8.0 | 9.1 |
| 10 | 6.75 | 15 | 370 | 8.3 | 10.1 |
| 20 | 7.72 | 22 | 490 | 8.6 | 14.3 |
| 30 | 8.15 | 22 | 575 | 6.9 | 15.6 |
| 40 | 8.55 | 24 | 660 | 7.3 | 16.8 |
| 50 | 9.94 | 36 | 600 | 5.4 | 11.6 |
| 60 | 11.60 | 34 | 620 | 5.0 | 8.8 |
| 70 | 14.65 | 46 | 750 | 3.8 | 8.8 |
| 80 | 14.70 | 40 | 745 | 3.6 | 9.0 |
| 90 | 16.55 | 52 | 860 | 3.1 | 4.2 |
| 100 | 16.80 | 56 | 1,160 | 2.5 | 4.8 |

Example 2

In Table IV are reported the values determined on sheets vulcanized in a press at 165° C. for 30 minutes, these sheets having the composition of mix E.

| Amount by weight | Mix E | Mix F |
| --- | --- | --- |
| Copolymer (ethylene-propylene) | 100-X | 100-X |
| Polyisobutene (Vistanex L-100) [1] | (Variable) | (Variable) |
| Carbon black (HAF furnace) | 50 | 50 |
| Tert. butyl cumyl peroxide | 3 | 4 |
| Sulfur | 0.75 | 1 |

[1] Having an intrinsic viscosity (measured in tetrahydronaphthalene at 135° C.) of 3.1, a Mooney viscosity (ML 1+4, 100° C.) of 63, and polymerized with brominetrifluoride at a temperature below −80° C.

Figure 2:
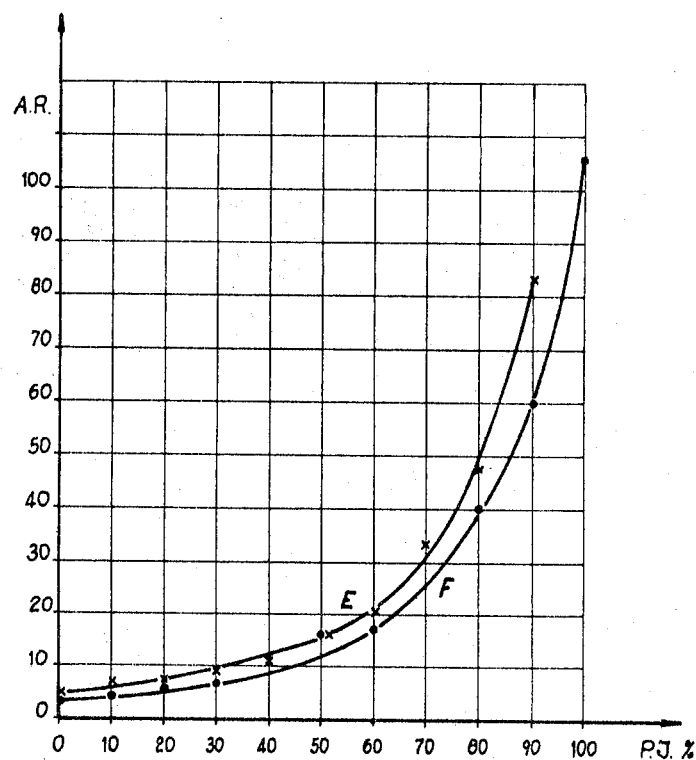

From Table IV the diagram shown in FIGURE 2 was prepared, which shows the values of residual elongation A.R. (after holding for 1 hour with an elongation of 200% and reading 1 minute after elastic recovery) of mixes E and F with increasing proportions of polyisobutene (abscissae). From this figure it appears that a mix containing up to 60% by weight of polyisobutene retains the capacity of elastic recovery of a rubber within completely satisfactory limits.

Above this percentage, the values of residual elongation quickly approach those of polyisobutene alone, that is, those of a plastic material.

Figure 3:
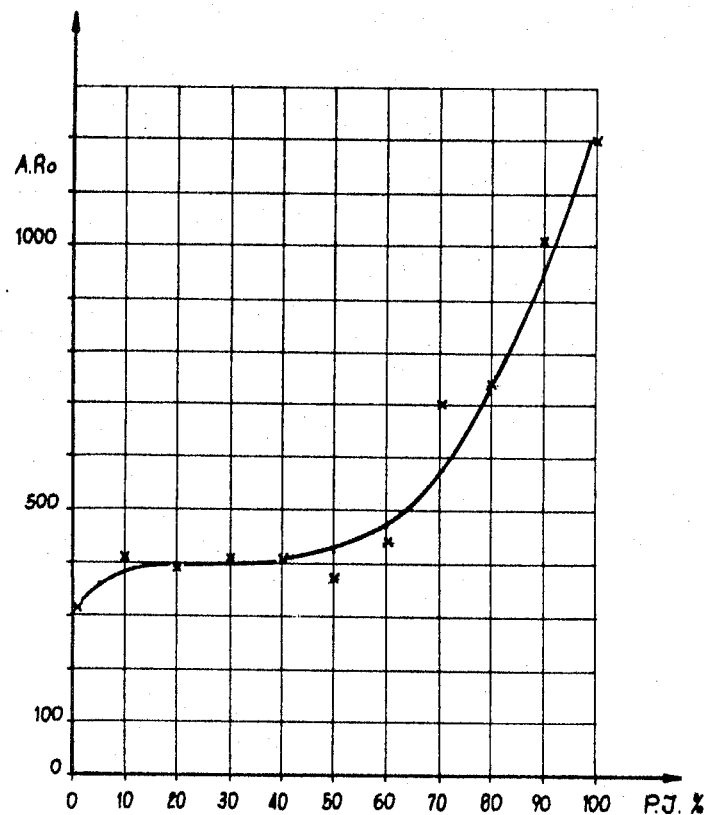

The diagram shown in FIGURE 3, also obtained from Table IV, shows the values of elongation at break (A. R.). The same observations apply as were made with respect to residual elongation.

The values of elongation at break remain almost unaltered when the amount of polyisobutene varies from 0 to 60%; when the polyisobutylene is present in amounts greater than 60%, the value of elongation at break rises rapidly.

TABLE IV

| Polyisobutene, percent by weight | Elongation at break, percent | Modulus at 300%, kg./cm.² | Tensile strength, kg./cm.² | Residual elongation after elongation at 200% for 1 hour and reading after 1 min., percent |
|---|---|---|---|---|
| 0 | 310 | 121 | 130 | 5 |
| 10 | 415 | 111 | 172 | 7 |
| 20 | 390 | 110 | 156 | 7 |
| 30 | 410 | 101 | 143 | 10 |
| 40 | 410 | 85 | 127 | 11 |
| 50 | 385 | 73 | 95 | 16 |
| 60 | 440 | 62 | 86 | 20 |
| 70 | 700 | 36 | 75 | 34 |
| 80 | 745 | 38 | 69 | 48 |
| 90 | 1,010 | 11 | 37 | 84 |

The preceding examples have been reported in order to show that with covulcanized mixes of ethylene-propylene or ethylene-butene copolymer and polyisobutene the mechanical properties remain unexpectedly good up to high proportions of polyisobutene (about 60%), both in the case of vulcanized products alone or charged with carbon black and/or with other reinforcing fillers.

*Example 3*

The permeability to oxygen at 30 to 90° C. was determined as described hereinafter on five mixes of copolymer and polyisobutene, vulcanized in a press at 165° C. for 30 minutes.

The composition of the five mixes was:

| Mix No | 1 | 2 | 3 | 4 | 5 |
|---|---|---|---|---|---|
| Ethylene-propylene copolymer | 100 | 75 | 50 | 25 | 0 |
| Polyisobutene (Vistanex L) | 0 | 25 | 50 | 75 | 100 |
| Tertiary butyl cumyl peroxide | 4 | 4 | 4 | 4 | 4 |
| Sulfur | 1 | 1 | 1 | 1 | 1 |

In Table V are reported the mechanical characteristics determined on sheets made from mixes 1, 2, 3, 4 and 5.

TABLE V

| Mixes | Mechanical properties | | | |
|---|---|---|---|---|
| | Degree of swelling after permanence for 24 hours in CCl₄ at 30° C. percent | Tensile strength, kg./cm.² | Elastic modulus at 300%, kg./cm.² | Elongation at break, percent |
| 1 | 6.3 | 10.1 | 10.7 | 360 |
| 2 | 7.2 | 14.7 | 8.2 | 460 |
| 3 | 8.8 | 17.6 | 6.1 | 500 |
| 4 | 10.2 | 10.4 | 4.2 | 680 |
| 5 | 15.1 | 4.8 | 2.8 | 1,430 |

In Table VI are reported the coefficients of permeability to oxygen at various temperatures for mixes No. 1, 2, 3, 4 and 5 determined in cm.² × sec.$^{-1}$ × atm.$^{-1}$.

TABLE VI

| | Temperature Mixes | | | |
|---|---|---|---|---|
| | 30° C. | 50° C. | 70° C. | 90° C. |
| 1 | 32.2×10$^{-8}$ | 81.9×10$^{-8}$ | 151.0×10$^{-8}$ | 242.0×10$^{-8}$ |
| 2 | 14.4×10$^{-8}$ | 37.1×10$^{-8}$ | 85.1×10$^{-8}$ | 164.2×10$^{-8}$ |
| 3 | 10.3×10$^{-8}$ | 23.8×10$^{-8}$ | 43.0×10$^{-8}$ | 86.2×10$^{-8}$ |
| 4 | | 13.5×10$^{-8}$ | 31.1×10$^{-8}$ | 79.0×10$^{-8}$ |
| 5 | | 8.5×10$^{-8}$ | 17.4×10$^{-8}$ | 51.8×10$^{-8}$ |

Figure 4:
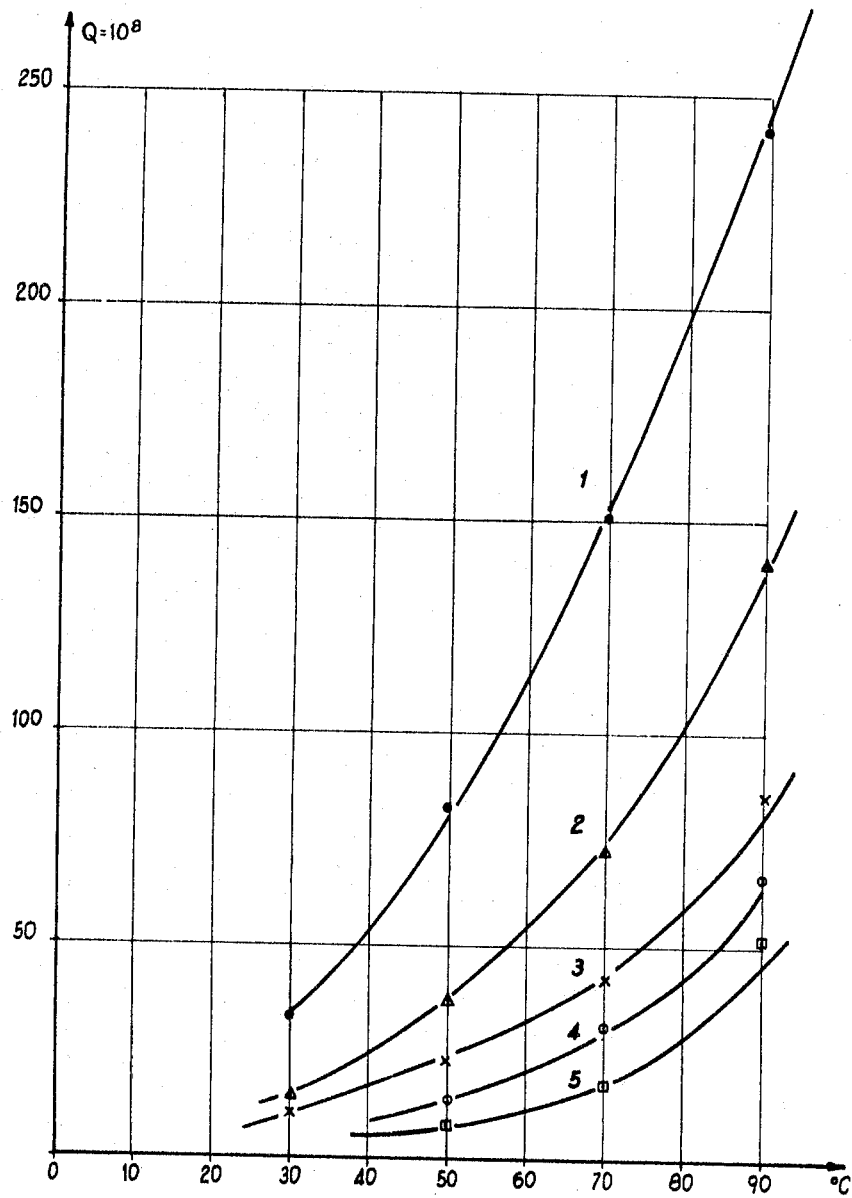

The determinations of the permeability were carried out by the slightly modified method of G. I. van Amerongen (Rubber Chemistry and Technology, 1947, vol. XX, No. 2, page 479)—which consists substantially of placing an elastomer membrane between two metallic chambers with a known pressure difference and then, after suitable stabilization of the diffusion and of the temperature, measuring the gas amount diffused therethrough per unit time. The values of Table VI are reported in FIGS. 4 and 5. FIGURE 4 shows the values of permeability constant Q (cm.² × sec.$^{-1}$ × atm.$^{-1}$) (on the ordinate) as a function of the temperature (on the abscissae) for mix 1 (copolymer alone), mix 2 (25% of polyisobutene), mix 3 (50% of polyisobutene), mix 4 (75% of polyisobutene) and mix 5 (100% of polyisobutene).

From FIGURE 4 it appears that the permeability constant of the various mixes varies with the temperature in an exponential manner, according to the well known laws which regulate this phenomenon in the elastomers. (See e.g., R. Houwink: Elastomers and Plastomers—I, page 310, Amsterdam, 1950.)

In constrast, in FIGURE 5, are reported the variations of the permeability constant Q $$(cm.^2 \times sec.^{-1} \times atm.^{-1})$$

(on the ordinate) by varying the proportion of polyisobutylene by weight (on the abscissae) at different temperatures.

It has surprisingly been found that the permeability to oxygen (and therefore to other gases) decreases quickly by the addition of a small amount of polyisobutene to the mix. It should be noted that with 50% of polyisobutene the permeability at any temperature decreases and is about one-third that for the 100% ethylene-propylene copolymer.

*Example 4*

The following three mixes were prepared and vulcanized (at 165° C. for 40 minutes).

| Mix No | 6 | 7 | 8 |
|---|---|---|---|
| Copolymer (ethylene-butene) | 100 | 50 | 0 |
| Polyisobutene (Vistanex L) | 0 | 50 | 100 |
| Tertiary butyl cumyl peroxide | 4 | 4 | 4 |
| Sulfur | 1 | 1 | 1 |

Note.—In the copolymer the ethylene-butene molar ratio is 60:40; the molecular weight is 220,000; the Mooney viscosity (MLI+4−100° C.) is 80.

The respective mechanical characteristics are:

| | | | |
|---|---|---|---|
| Swelling degree in CCl₄ (24 hours at 30° C.), percent | 7.4 | 10.3 | 15.1 |
| Tensile strength, kg./cm.² | 12.2 | 15.3 | 4.8 |
| Modulus at 300%, kg./cm.² | 9.8 | 6.4 | 2.8 |
| Elongation at break, percent | 450 | 620 | 1,430 |

The respective coefficients of permeability to oxygen are:

| Temperature | Coefficient Q in cm.² × sec.$^{-1}$ × atm.$^{-1}$ | | |
|---|---|---|---|
| | Mix 6 | Mix 7 | Mix 8 |
| 30° C | 29.1×10$^{-8}$ | 8.9×10$^{-8}$ | |
| 50° C | 75.0×10$^{-8}$ | 20.2×10$^{-8}$ | 8.5×10$^{-8}$ |
| 70° C | 142.7×10$^{-8}$ | 40.8×10$^{-8}$ | 17.4×10$^{-8}$ |
| 90° C | 215×10$^{-8}$ | 95.3×10$^{-8}$ | 51.8×10$^{-8}$ |

It is logical that, as confirmed by long experience, if the aforementioned mixes had been charged with carbon black, even lower permeability values would have been obtained.

In conclusion, according to the present invention it appears that the presence of polyisobutene with an ethylene-propylene or ethylene-butene copolymer unexpectedly affords the two following advantages, (1) with polyisobutene in an amount up to 60%, the mix is covulcanized satisfactorily and the mechanical characteristics of the ethylene-propylene or ethylene-butene copolymer remain unaltered, (2) with polyisobutene in an amount from 40% to 100%, vulcanized products having very good impermeability to gases are obtained.

Therefore, if an optimum range is desired which makes it possible to combine good mechanical properties with good properties of impermeability to gases, it is desirable to prepare covulcanized products containing from about 40 to 60% of polyisobutene in admixture with an ethylene-alphaolefin copolymer.

On the other hand, for some technological problems relating to rubber it may be desirable to regulate the permeability in order to permit the exit of some gases but to avoid the entry of vapors, etc.; the addition of suitable amounts of polyisobutene to the mixes of copolymer makes it possible to attain this aim.

The copolymers used in the mixes and elastomers according to the invention have an ethylene content of from about 20 to 80 mole percent, a molecular weight of from about 30,000 to 1,000,000, and preferably from about 80,000 to 200,000.

Variations can of course be made without departing from the spirit of my invention.

Having thus described my invention, what I desire to secure and hereby claim is:

1. A co-vulcanizable mixture comprising at least one saturated elastomeric amorphous copolymer of ethylene with an alphaolefin selected from the group consisting of propylene and butene, and solid polyisobutene in an amount up to about 60% by weight of the copolymer-polyisobutene mixture, and at least a vulcanizing amount of sulfur and organic peroxide, said copolymer containing from about 20 to 80 mole percent of ethylene and having a molecular weight of from about 30,000 to 1,000,000.

2. The co-vulcanizable mixture of claim 1 wherein the alpha-olefin is propylene.

3. The co-vulcanizable mixture of claim 1 wherein the alpha-olefin is butene.

4. The co-vulcanizable mixture of claim 1 wherein a quinone compound selected from the group consisting of p-benzoquinone dioxime and quinone dioxime, a reinforcing filler, a stabilizer, and pigment are incorporated therein.

5. The mixture of claim 1 wherein said organic peroxide is tertiarybutyl cumyl peroxide.

6. An elastomer vulcanized with at least a vulcanizing amount of an organic peroxide and sulfur and containing an elastomeric amorphous copolymer of ethylene with an alpha-olefin selected from the group consisting of propylene and butene, and solid polyisobutene in an amount up to about 60% by weight of the copolymer-polyisobutene mixture, said copolymer containing from about 20 to 80 mole percent of ethylene and having a molecular weight of from about 30,000 to 1,000,000, said elastomer being characterized by relatively high impermeability to gases and excellent mechanical characteristics.

7. The elastomer of claim 6 in which is incorporated a filler, stabilizer, and pigment.

8. The elastomer of claim 6 wherein said organic peroxide is tertiarybutyl cumyl peroxide.

9. An elastomer vulcanized with at least a vulcanizing amount of an organic peroxide and sulfur and containing an elastomeric amorphous copolymer of ethylene with an alpha-olefin selected from the group consisting of propylene and butene, and solid polyisobutene in an amount from about 40 to 60% by weight of the copolymer-polyisobutene mixture, said copolymer containing from about 20 to 80 mole percent of ethylene and having a molecular weight of from about 30,000 to 1,000,000, said elastomer being characterized by excellent mechanical characteristics coupled with a high impermeability to gases.

10. The elastomer of claim 9 in which is incorporated a filler, stabilizer, and pigment.

References Cited by the Examiner

UNITED STATES PATENTS

| | | | |
|---|---|---|---|
| 2,383,839 | 8/1945 | Beekley | 260—79.5 |
| 2,710,291 | 6/1955 | Little | 260—79.5 |
| 2,748,109 | 5/1956 | Viohl | 260—79.5 |
| 2,927,104 | 3/1960 | Small et al. | 260—94.8 |
| 2,993,876 | 7/1961 | McGlamery | 260—45.95 |
| 3,012,016 | 12/1961 | Kirk et al. | 260—79.5 |
| 3,012,020 | 12/1961 | Kirk et al. | 280—88.2 |
| 3,047,552 | 7/1962 | Reynolds et al. | 260—88.2 |
| 3,074,616 | 1/1963 | Martivovich et al. | 229—53 |
| 3,093,614 | 7/1963 | Mackenzie et al. | 260—41 |
| 3,097,150 | 7/1963 | Rainer et al. | 204—154 |

OTHER REFERENCES

Ito: 57 CA 1034i, 1960 Chemical Abstract, vol. 57 (1960).

JOSEPH L. SCHOFER, *Primary Examiner.*

R. A. BURROUGHS, M. P. HENDRICKSON, E. J. SMITH, *Assistant Examiners.*